H. MAYTROTT.
LAMP.
APPLICATION FILED APR. 27, 1912.
1,057,353.
Patented Mar. 25, 1913.
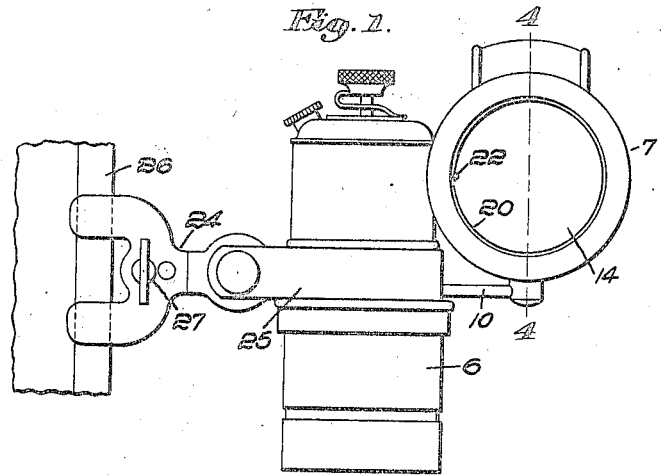
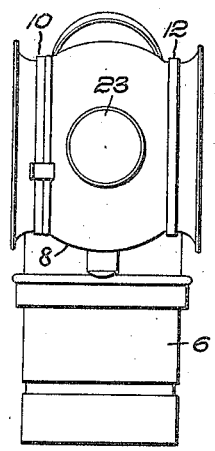
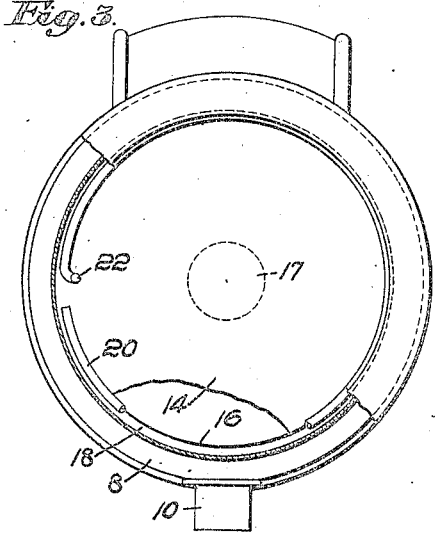
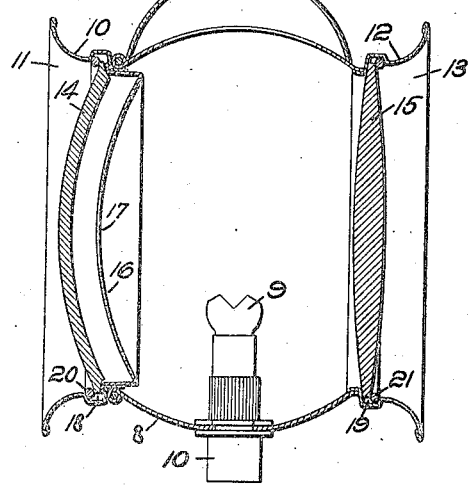
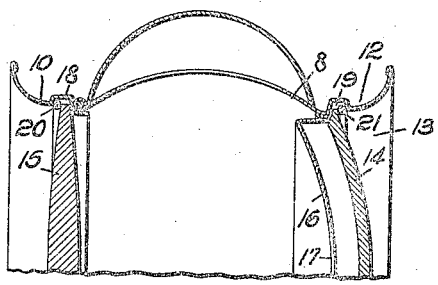
Witnesses:
Horace A. Croseman
Carl L. Choate
Inventor:
Henry Maytrott.
By Emery, Booth, Janney & Varney,
Attys

UNITED STATES PATENT OFFICE.

HENRY MAYTROTT, OF BRIDGEPORT, CONNECTICUT, ASSIGNOR TO THE HAWTHORNE MANUFACTURING COMPANY, INC., OF BRIDGEPORT, CONNECTICUT, A CORPORATION OF CONNECTICUT.

LAMP.

1,057,353.

Specification of Letters Patent.

Patented Mar. 25, 1913.

Application filed April 27, 1912. Serial No. 693,584.

*To all whom it may concern:*

Be it known that I, HENRY MAYTROTT, a citizen of the United States, and a resident of Bridgeport, county of Fairfield, and State of Connecticut, have invented an Improvement in Lamps, of which the following description, in connection with the accompanying drawing, is a specification, like characters on the drawings representing like parts.

My invention relates to lighting apparatus, and more particularly though not exclusively to lamps for vehicles, and will be best understood by reference to the following description, when taken in connection with the accompanying illustration of one specific embodiment thereof, while its scope will be more particularly pointed out in the appended claims:

In the drawings:—Figure 1 is an elevation of a carriage lamp embodying my invention, showing the same as it appears when attached to the dash of the carriage, a portion of the dash being shown to illustrate its mode of attachment thereto: Fig. 2 is an elevation of the lamp as viewed from the right-hand side of Fig. 1; Fig. 3 is a detail elevation on an enlarged scale of a portion of one end of the lamp illustrating the mode of fastening the lenses in place; Fig. 4 is a sectional view on an enlarged scale on line 4—4 of Fig. 1; and Fig. 5 is a similar longitudinal section partly broken away, showing the lenses inter-changed from their relative positions shown in Fig. 4.

Referring to the drawings, and to the embodiment of my invention which I have there disclosed for illustrative purposes, I have there shown a vehicle lamp having a lamp-supply section 6, and a lamp section 7—7 located at the side of the lamp-supply section and comprising a casing 8 within which is located a light-furnishing element 9. While my invention is applicable to kerosene, electric, and other lamps, I have herein chosen to illustrate a lamp of the acetylene gas type, in which the lamp-supply section 6 consists of a generator, and the light-furnishing element 9 consists of a usual acetylene gas burner, the latter being furnished with its supply from the lamp-supply section by a suitable conductor 10 extending laterally from the lamp-supply section to the light-furnishing element 9.

The casing 8 may be provided at one end with a door-frame 10 having an aperture 11, and may be provided at its other end with a fixed frame 12, having an aperture 13. Located in these apertures are suitable interchangeable light-transmitting elements 14 and 15 respectively, herein in the form of lenses, the lens 14 being preferably though not necessarily red, and the lens 15 white, the former serving as a rear, or tail-light, and the latter as a front, or head-light, sometimes called a side-light. Associated with the lens 14 is a light-reflecting element 16, herein consisting of a suitable reflector provided with an aperture 17 of suitable size to permit some of the rays of light to pass therethrough and through the lens 14, while the remaining rays of light strike the reflector and are reflected so as to pass through the lens 15.

The lens 14 and the reflector 16 and the lens 15 are interchangeably mounted in the casing in any suitable manner, as for example by providing the frames 10 and 12 respectively with annular grooves 18 and 19 forming seats for the lenses and reflector, and by providing spring retaining rings 20 and 21 also seated in said grooves and bearing against the outer faces of the lenses in such a manner as to securely hold the latter in place, and yet permit them to be instantly removed. For this purpose, the ring 20 may be provided with a grasping portion 22 (and the ring 21 may also be similarly provided) in a conveniently accessible position to be grasped by the fingers and drawn inwardly to contract the ring so as to permit its withdrawal. The lens 14 and reflector 16 may then be removed and substituted for the lens 15, and the latter substituted for the former. In this way, the front of the lamp becomes the back and the back the front. The lamp may be provided with a light-transmitting element 23, located at the side of the casing 8 opposite the lamp-supply section 6 and at one side of the median axial line of the lenses. In other words, the light-transmitting elements 14 and 15 are located in a plane transverse to a plane passing through the light-furnishing element 9 and light-transmitting element 23.

The lamp may be provided with any suitable supporting means, as for example a bracket 24 located at the opposite side of the lamp-supply section or generator 6 to that on which the lamp section 7 is located. Herein the bracket 24 is secured to the generator 6 by a band 25 surrounding the latter, and is clamped to the edge of a dash 26 in any suitable manner, as for example by means of a clamp-screw 27. By this means, the lamp may be placed on the other side of the carriage in such a manner as to project laterally therefrom, the position of the lamp section being such that the rays of light will be shed without obstruction toward the front and rear of the vehicle. It will now be apparent that this same lamp may be utilized for either the right or left side of the carriage by simply reversing the same, and interchanging the lenses and the reflector, while the inner side light furnished by the light-transmitting element 23, and which is usually formed of red glass, serves for either the right or left-hand side light. This construction avoids the necessity of making lamps in pairs,— that is to say, it avoids the use of one lamp particularly constructed for the left-hand side of the carriage, and another particularly constructed for the right-hand side of the carriage, inasmuch as the lamp of my invention may be readily converted from a right-hand to a left-hand lamp and vice versa.

While I have herein shown and described one form of my invention for illustrative purposes, and have disclosed and discussed in detail the construction and arrangement incidental to one specific embodiment thereof, it is to be understood that the invention is limited neither to the mere details or relative arrangement of parts, nor to its specific embodiment herein shown, but that extensive deviations from the illustrated form or embodiment of the invention may be made without departing from the principles thereof.

Having thus described one embodiment of my invention, what I claim is:

1. In a lighting apparatus, the combination with a lamp-supply section of a lamp section located laterally of the lamp-supply section, and comprising a light-furnishing element, a pair of interchangeable light-transmitting elements located at opposite sides, respectively, of the light-furnishing element, and an interchangeably mounted apertured light-reflecting element associated with and disposed in front of one of the light-transmitting elements.

2. In a lighting apparatus, the combination with a lamp-supply section of a lamp section located laterally of the lamp-supply section, and comprising a casing provided with opposite apertures, a light-furnishing element disposed between said apertures, a pair of light-transmitting elements interchangeably mounted in said apertures, respectively, and attaching means at the opposite side of the lamp-supply section for attaching the lamp-supply section to a suitable support, the median axial line of said light-transmitting elements being located laterally of said lamp supply section and at the side of the latter opposite said attaching means.

3. In a lighting apparatus, the combination of the lamp-casing 8, provided with the grooves 18 and 19, a light-furnishing element, interchangeable light-transmitting elements located at opposite sides respectively of the light-furnishing element with their marginal portions in said grooves, the retaining rings 20 and 21, and the apertured reflector 16 with its marginal portion in one of said grooves.

4. In a lighting apparatus, the combination of a casing, a light-furnishing element within said casing, a pair of interchangeable light-transmitting elements located at opposite sides, respectively, of the light-furnishing element, and an interchangeably-mounted apertured light-reflecting element interposed between said light-furnishing element and one of said light-transmitting elements.

In testimony whereof, I have signed my name to this specification, in the presence of two subscribing witnesses.

HENRY MAYTROTT.

Witnesses:
ELLSWORTH A. HAWTHORNE,
E. HORACE HAWTHORNE.